Sept. 20, 1932.  F. W. SIGSBEY ET AL  1,878,990
MICROMETER GAUGE
Filed Sept. 26, 1928  2 Sheets-Sheet 1
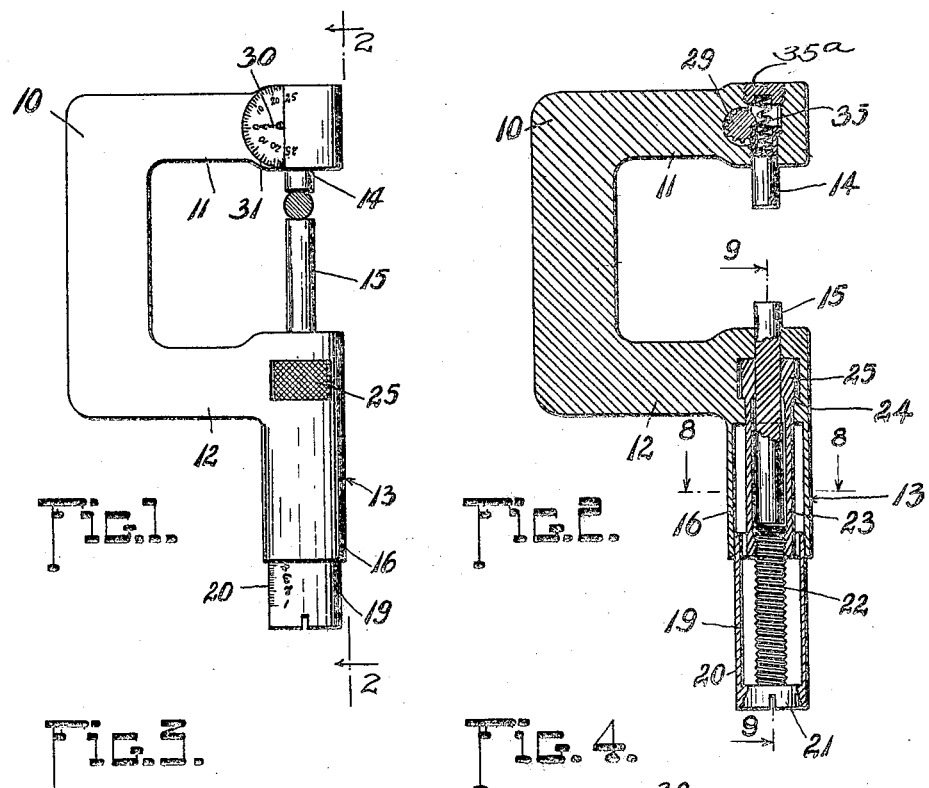
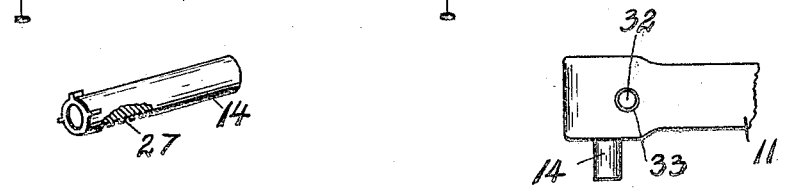
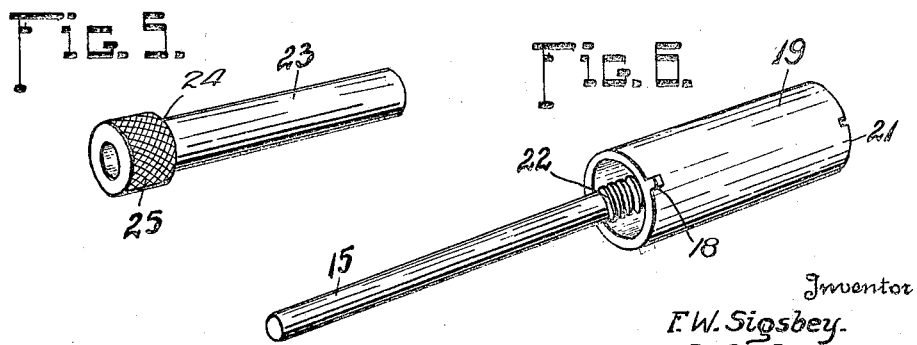
Inventor
F. W. Sigsbey.
H. D. Goshorn.
By Robert Cobb
Attorneys Sept. 20, 1932.  F. W. SIGSBEY ET AL  1,878,990
MICROMETER GAUGE
Filed Sept. 26, 1928  2 Sheets-Sheet 2
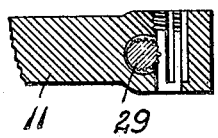
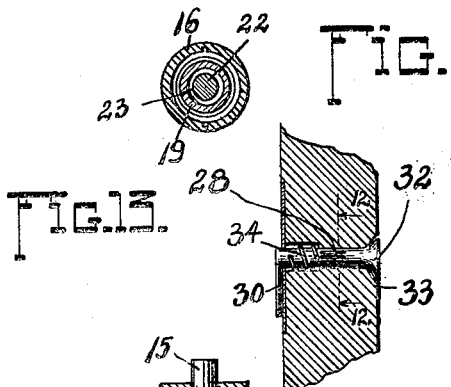
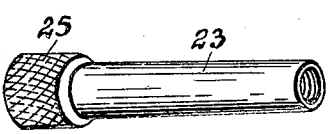
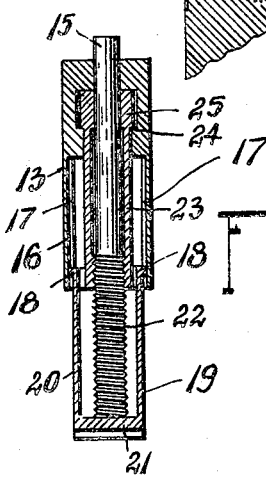
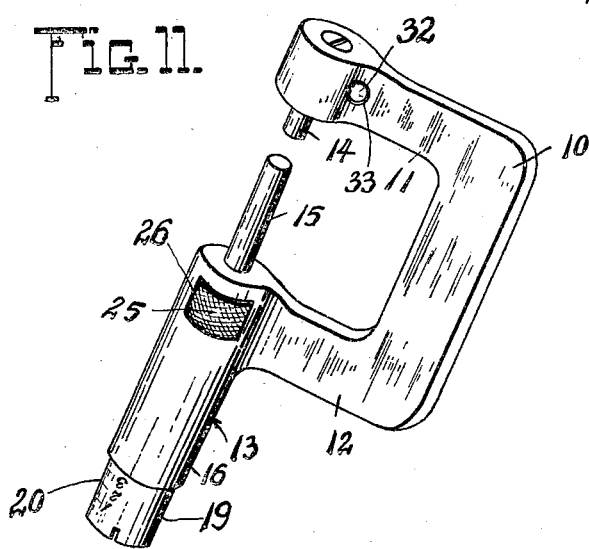
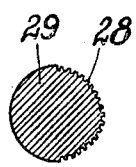
Inventor
F. W. Sigsbey.
H. D. Goshorn.
By Robert Cobb
Attorneys Patented Sept. 20, 1932

1,878,990

UNITED STATES PATENT OFFICE

FRED W. SIGSBEY AND HARRY D. GOSHORN, OF WILLOUGHBY, OHIO

MICROMETER GAUGE

Application filed September 26, 1928. Serial No. 308,374.

In the measurement of minute distances, as with a micrometer gauge, great difficulty has been experienced in making quick and accurate measurements where a nicety of work is required, and a great deal of time is lost incident to the discontinuing of work while the measurements are being read as well as incidental to the taking of such measurements.

Another difficulty subsidiary to the above arises from the fact that in instrumentalities for taking such measurements, the registering attachments are likely to become displaced from any reading on which they may be arbitrarily set owing to the construction of said parts and their exposure to frictional influences when the instrument is laid down or even while still held in the hand of an operator. In consequence, for each reading where a known dimension is desired, the instrument must be reset and cannot be adjusted to serve for a plurality of similar readings.

It is an object of the present invention to provide a measuring instrumentality of the above character which may be adjusted for any given reading and which, when so adjusted, will maintain the position of adjustment until manually thrown out of such adjustment, which may be quickly and readily applied to the object to be measured and which is provided with a registering device operable under pressure to indicate variations from the set measurement and which may be held under pressure in such position of registration until a reading may be taken, after the device is removed from the object being measured.

The invention will be hereinafter described in connection with micrometer calipers although it is to be understood that the invention is capable of a wide application, however it is believed that its principles are better illustrated with an instrumentality of this character. Such a caliper usually consists of a U-shaped yoke having two parallel legs and a stem or handle projecting from one of the legs substantially at right angles thereto. In such devices there are usually a pair of abutment spindles extending into the gap toward each other and one of these spindles is ordinarily adjustable to and from the other and is provided with a rotatable sleeve secured at its rear end to the spindle and movable in the handle to advance or retract said spindle to or from the more or less stationary abutment. Graduations formed on one edge of the sleeve and graduations on the handle cooperate in a well known manner to register an extremely fine fractioning of the entire length of movement. An objection to this arrangement is that the sleeve moving exteriorly of the handle is readily displaced from any position of adjustment owing to the influence of friction thereupon due to the exposed position of the sleeve. It is proposed in the present device to provide in this particular a sleeve which is movable inside of a comparatively stationary handle and to depend for the adjustment thereof on a member lying in a more protected position. The stem or spindle referred to above is preferably threaded and is constructed to cooperate with an internally threaded sleeve also located interiorly of the handle and having a milled operating portion extending through an opening in the device, preferably in one side of the leg of the yoke to which the handle is attached. This construction will be depended upon, ordinarily, merely for the comparatively coarse adjustment for which such instrumentalities are used, and may be set for as fine an adjustment as 25/1000 of an inch, the finer adjustment being made through the instrumentality of a spindle slidably mounted in the other leg of the yoke and in alignment with the spindle as above described. This spindle is preferably resiliently urged toward the first main spindle and has associated therewith registering instrumentalities by means of which the extent of depression of said spindle under the influence of pressure from an object being measured, may be indicated.

The details of construction whereby the above device has been perfected and made practical for use will be delineated in the following specification in detail from which numerous additional advantages of my device will be made apparent incident to the description thereof and such advantages will be incorporated in the claims appended thereto.

In the drawings:

Figure 1 is a plan view of the micrometer gauge constituting the subject of the invention.

Figure 2 is a section through the gauge showing the internal construction thereof, taken generally in a vertical plane 2—2 of Figure 1, looking in the direction of the arrows.

Figure 3 is a detail of one of the spindles.

Figure 4 is a fragmentary detail of one of the legs of the yoke showing the member illustrated in Figure 3 in place therein.

Figure 5 is a further detail showing the spindle actuating means for one of the spindles of the gauge.

Figure 6 illustrates the spindle gauge with which the element in Figure 5 cooperates.

Figure 7 is a detailed section of the leg illustrated in Figure 4 and showing the registering spindle in place, the spindle represented in Figure 3 being omitted.

Figure 8 is a section on the line 8—8 of Figure 2, showing the relation of the various parts.

Figure 9 is a detailed section of the handle of the device with the spindle in place therein and showing the relationship of the cooperating parts, taken on the line 9—9 of Figure 2, looking in the direction of the arrows.

Figure 10 is a further view of the spindle actuating means disclosing the threaded inner end.

Figure 11 is a perspective view of the micrometer gauge showing the reverse side from that shown in Figure 1.

Figure 12 is a section of the registering spindle on an enlarged scale and showing the gear teeth associated therewith.

Figure 13 is a fragmentary sectional view showing the indicator construction.

The device as outlined above and constituting an illustrative embodiment of the invention is comprised of a yoke 10 having parallel legs 11 and 12, from the latter of which a handle or stem 13 projects at substantially right angles thereto. These legs are provided adjacent their outer ends with abutment members 14 and 15 in the nature of spindles adapted to be used in cooperation with each other as measuring devices for an object placed therebetween. These spindles are slidably mounted and are in axial alignment with each other, the spindle 14 being yieldably pressed toward the spindle 15 by resilient means hereinafter to be described, while the spindle 15 is adapted to be set in any position of adjustment relative to the spindle 14 and the adjusting means is so constructed that it will, under ordinary circumstances, remain in the position for which it is set. The means by which this adjustment is brought about will now be described in detail.

The handle 13 consists of a tubular sleeve 16 secured to the leg 12 of the yoke and preferably rigidly formed therewith. This tubular sleeve is provided internally with slideways 17 extending longitudinally thereof to accommodate the splines 18 formed on the sleeve 19 which is adapted to fit in slidable relation within the tube 16. The sleeve 19 may be calibrated as indicated at 20 with the calibrations preferably running from zero at the outer end to any arbitrary number adjacent the inner end thereof, so that as the sleeve 19 moves outwardly, the distance of movement will be correctly indicated at the outer edge of the tubular member 16. The sleeve 19 is closed at its outer end by means of a head 21 to which is attached the stem or spindle 15 in coaxial relation therewith. This stem or spindle is provided with screw threads as at 22 which cooperate with the internal threads in the bore of a tubular member 23 which is mounted for rotary movement within the handle and is prevented from longitudinal movement by the shoulder 24 formed by the juncture with the sleeve of a milled head 25, the milled head being positioned to project a slight distance into an aperture 26 formed in at least one face of the instrument preferably in the upper end of the leg 12. The leg at this opening may extend beyond the outer periphery of the milled head so that said head may not project beyond the surface of the device, in this manner further insuring against movement of the spindle 15 from its set position. The slideways 17 constitute slots formed in the wall 16, these slots extending to the terminus of the tube 16.

The splines are mounted and fixedly secured in the sleeve 19, and at the end thereof, and in alignment with the slideways 17, so that the sleeve 19 with its splines 18 connected thereto, enters the tube 16 from the end, the splines registering with the slideways 17. The sleeve is held in operative relation there in through the instrumentality of the calibrating screw 32 and the member 33 in the tube 16.

The spindle 14, slidably mounted in the leg 11 of the yoke member, normally projects laterally therefrom toward the spindle 15, a known distance beyond the leg 11. The spindle 14 is provided longitudinally thereof with a rack 27 cooperatively meshing with ridges 28 extending longitudinally of an indicator shaft 29, which is rotatably mounted in the leg 11. The indicator shaft 29 extends preferably at right angles to the spindle 14 and is rotatably journaled in the leg 11 so that any movement of the member 14 will be communicated thereto through the rack 27 and the the ridges 28, which act as gear teeth projecting between the teeth of the rack. One end of the indicator shaft 29 is provided with a pointer 30 movable, by the turning of the shaft, over a dial 31 on the surface of the leg 11. The opposite end of the shaft is provided with a head 32 which is received in a recess 33 formed in the opposite face of the leg 11 to that on which the dial is formed. The dial is preferably graduated both ways from a zero point centrally thereof and is semicircular in contour and the pointer 30 when permitted to move freely over the face of the dial is urged to the right extremity of the dial by the force of the spring 34 coiled about the shaft 29 and having one end attached in the leg 11 and the other to the shaft. The relationship between the member 14 and the indicator shaft 29 is such that when the member 14 is pressed backward to its innermost limit, the pointer 30 will be moved to the opposite extremity of the dial from that which it will naturally assume under the influence of the spring 34. The spring 34 is delicate in character and may be supplemented by a second spring indicated by the numeral 35 and acting directly on the spindle 14, as indicated in the drawings. This spring may be in the nature of a compression spring acting at the rear end of the spindle 14 and held in place by the threaded plug 35a.

In the use of this device the spindle 15 may be moved to a predetermined position such that the work to be measured will extend between the spindle 15 and the spindle 14 when the latter is in position for the indicator 30 to rest upon the zero mark. With this relationship a measurement may be taken without further adjusting the device, depending on the indicator 30 to register the excess or insufficiency of the work, the pointer moving in one direction from the zero point to indicate excess, and in the opposite direction to indicate the insufficiency. When a registration of this character is made, the pointer may be held in its position of registration by a simple pressure of the finger on the head 32 whereupon the calipers may be removed from the work and the dial may be read by the operator. The facility with which a reading can be made with a device constructed after this manner it is believed will readily appear from the above description and the accuracy of such a reading is insured by the construction of the device to which the arrangement hereinbefore described in relation to the leg 12 is an important contributory part. The position of the milled head 25 on one leg of the yoke and of the head 32 on the other leg constitutes an arrangement whereby the device may be readily manipulated in all of its movements by the fingers of one hand leaving the operator's other hand free for other duties.

The graduations on the sleeve 19 constitute what is known as the coarse adjustment although it is to be understood that fine adjustment may also be provided in connection therewith. In the present embodiment however, the fine adjustment is confined to the leg 11.

In operation our improved device is capable of the following outstanding uses: To measure absolute dimensions and to measure variations in the dimensions of members having approximately the same dimensions.

Where it is intended to determine the relation between the dimension of the work and a standard dimension, the device is set for a standard measurement by rotating member 25 until the desired measurement is indicated by the graduations 20 and the dial 31. For example, if the standard measurement lies between any two consecutive graduations 20, and the lower of said graduations is brought in register with the end of the sleeve 16, the position of the indicator when the standard piece is between the spindles will readily show with fine precision the excess of the measurement over that indicated by said lower graduations. Or, if the higher of said graduations is in register with the end of sleeve 16, the indicator will show a value which must be subtracted from said higher graduation in order to obtain the true measurement. Then, having ascertained and noted the true dimension of the standard piece, the latter is removed and the work piece inserted between the spindles. The indicator will show to what extent the work piece dimension varies from that of the standard piece.

Where the standard dimension is known, and it is desired merely to ascertain the extent of variation of the work from the standard, the latter may be introduced between the spindles and the member 25 turned until both spindles engage the standard and the indicator is at zero. Then without disturbing said member 25 and with the finger holding the indicator in position, the standard may be removed and the work inserted in its place as the finger is removed. The new position of the indicator will show the difference in dimension between the work and the standard. If the indicator goes to the left of zero, the work is too large; if to the right, it is too small. It will be clear that any number of pieces of work may be tested relative to the standard merely by inserting each piece and noting the position of the indicator on the dial.

As heretofore stated, indicator 30 and the dial 31 provide the fine adjustment. That is, the space between any two consecutive graduations on the dial represent a movement of the spindle through a distance of, say, 0.001, while the space between any two consecutive graduations 20 may be 0.025.

In assembling the parts of our invention, right leg 12 is preformed with an opening which admits of the positioning of the head 25 as shown in Figure 2. The outer portion of the leg 12 is then compressed by any usual die or other operation so that the head 25 is permanently encased in said position.

Having thus described our invention, what we claim as new and desire to secure by Letters Patent of the United States, is:—

1. A device of the character described, having oppositely positioned abutment members supported thereon and adapted to receive therebetween a piece of work being measured, one of the said abutment members having yielding relation to its support, means associated therewith for indicating the movement of the said yieldable abutment member, and means normally inoperable yet manually operable, whereby the indicating means may be frictionally held in any position it may assume under influence of the yieldable member to permit removal of the work from between the abutment members without disturbing the said position of the indicating means.

2. In a micrometer gauge of the class described, a movable abutment member, a housing for said member, yieldable means urging said member in one direction, a rotatable member in said housing, the members being provided with means whereby longitudinal movement of the first member imparts rotary movement to the second member, a pointer secured to the second member, a dial over which the said pointer moves, and means normally inoperable but manually operable when desired, whereby the pointer may be frictionally held in any position it may assume under influence of the yieldable member to permit removal of the work from between the abutment members without disturbing the position of the pointer relatively to the dial.

3. In a micrometer gauge of the class described, an abutment member manually movable toward and away from an object to be measured, a housing therefor, a rotative member interposed between said housing and said abutment member, interengaging instrumentalities on the said abutment and rotative members for projecting and retracting the abutment member through the housing, the rotative member being provided with a milled finger grip portion disposed inwardly of the outer confines of the housing and substantially enclosed thereby to minimize possibility of accidental actuation of the rotative member with attendant disturbance of adjustment of the abutment member, a portion of the housing adjacent the finger grip portion being cut away to permit access to the said finger grip portion for actuation thereof.

4. In a micrometer gauge of the class described, an abutment member manually movable toward and away from an object to be measured, a housing therefor, the abutment member having a portion thereof threaded for projection and retraction through the housing, a sleeve secured to the threaded portion and slidable relatively to the housing, a rotative member interposed between the housing and abutment member and engaging the threaded portion of the member to effect adjustment thereof upon actuation of the rotative member, the said rotative member being provided with a milled finger grip portion disposed inwardly of the outer confines of the housing and substantially enclosed thereby to minimize possibility of accidental actuation of the rotative member with attendant disturbance of the abutment member, a portion of the housing adjacent the finger grip portion being cut away to permit access to the said finger grip portion for actuation thereof.

5. In a micrometer gauge of the character described, a housing, a sleeve member splined to the housing, an abutment member carried by the sleeve and movable therewith, toward and away from an object to be measured, and means for actuating the said member, the said means having a milled head disposed in the housing and providing a finger grip portion, the said finger grip portion being located within the confines of the outer periphery of the housing and substantially enclosed thereby, whereby accidental actuation of the means is prevented, a portion of the housing being cut away adjacent the finger grip portion to permit access thereto for actuation thereof.

6. In a micrometer gauge of the character described, a housing, a plurality of relatively movable, aligned abutment members adapted to engage opposite portions of an object to be measured, means resiliently urging one of said members toward the other, a dial on the housing adjacent the resiliently urged member, indicating instrumentalities adjacent the urged member and the dial, the said instrumentalities including a pointer and a shaft therefor, the shaft and urged member being provided with inter-engaging gear teeth, whereby movement of the said urged member imparts rotary movement to the shaft and pointer over the dial, and means normally inoperative but manually operable when desired for frictionally holding the pointer in any position on the dial.

In testimony whereof we affix our signatures.

FRED W. SIGSBEY.
HARRY D. GOSHORN.